(12) United States Patent
Lunttila et al.

(10) Patent No.: US 9,660,784 B2
(45) Date of Patent: May 23, 2017

(54) METHOD AND APPARATUS PROVIDING INTER-TRANSMISSION POINT PHASE RELATIONSHIP FEEDBACK FOR JOINT TRANSMISSION COMP

(71) Applicant: Nokia Solutions and Networks Oy, Espoo (FI)

(72) Inventors: Timo Erkki Lunttila, Espoo (FI); Weidong Yang, Hoffmann Estates, IL (US); Klaus Hugl, Wien (AT); Frederick Vook, Schaumburg, IL (US); Eugene Visotsky, Buffalo Grove, IL (US)

(73) Assignee: Nokia Solutions and Networks Oy, Espoo (FI)

( * ) Notice: Subject to any disclaimer, the term of this patent is extended or adjusted under 35 U.S.C. 154(b) by 62 days.

(21) Appl. No.: 14/419,757

(22) PCT Filed: Aug. 6, 2013

(86) PCT No.: PCT/EP2013/066475
§ 371 (c)(1),
(2) Date: Feb. 5, 2015

(87) PCT Pub. No.: WO2014/023727
PCT Pub. Date: Feb. 13, 2014

(65) Prior Publication Data
US 2015/0195071 A1 Jul. 9, 2015

Related U.S. Application Data

(60) Provisional application No. 61/679,954, filed on Aug. 6, 2012.

(51) Int. Cl.
*H04W 4/00* (2009.01)
*H04L 5/00* (2006.01)
(Continued)

(52) U.S. Cl.
CPC .......... *H04L 5/0053* (2013.01); *H04B 7/024* (2013.01); *H04B 7/0417* (2013.01);
(Continued)

(58) Field of Classification Search
CPC ...... H04W 72/04; H04W 88/08; H04W 76/00
See application file for complete search history.

(56) References Cited

U.S. PATENT DOCUMENTS

2010/0098009 A1* 4/2010 Higuchi ............. H01Q 1/246
370/329
2012/0281567 A1* 11/2012 Gao .................. H04B 7/0626
370/252

(Continued)

FOREIGN PATENT DOCUMENTS

WO  WO 2011/115421 A2  9/2011
WO  WO 2012/110863 A1  8/2012

OTHER PUBLICATIONS

61556637 Provisional Specification.*

(Continued)

*Primary Examiner* — Siren Wei
(74) *Attorney, Agent, or Firm* — Harrington & Smith

(57) ABSTRACT

Systems and techniques for joint transmission cooperative multi-point. A set of n CSI reference signal resources are to be measured by a user device. The n CSI reference signal resources include at least one CSI reference signal resource spanning over at least two transmission points. Channel state information feedback corresponding to each CSI reference signal resource is configured. Upon receiving CSI from the user device, at least one precoder is selected for coherent joint cooperative multipoint transmission based on inter-transmission point phase relationship information. A cophasing factor is derived from transmitted precoders over a cross-cell CSI reference signal resource, the derivation including transmission of reference signals using first and (Continued)

second precoding vectors on two ports, computation of a third vector using feedback based on the precoded reference signals, and computation of the co-phasing factor based on the first, second, and third vectors.

17 Claims, 13 Drawing Sheets

(51) Int. Cl.
  *H04B 7/0417* (2017.01)
  *H04B 7/0456* (2017.01)
  *H04B 7/024* (2017.01)
  *H04B 7/06* (2006.01)

(52) U.S. Cl.
  CPC ......... *H04B 7/0456* (2013.01); *H04L 5/0035* (2013.01); *H04L 5/0048* (2013.01); *H04L 5/0057* (2013.01); *H04B 7/0639* (2013.01)

(56) References Cited

U.S. PATENT DOCUMENTS

| | | | | |
|---|---|---|---|---|
| 2012/0287799 A1* | 11/2012 | Chen | ...................... | H04B 7/024 370/252 |
| 2013/0114656 A1* | 5/2013 | Sayana | .................. | H04B 7/024 375/219 |
| 2013/0194943 A1* | 8/2013 | Davydov | .......... | H04W 72/0493 370/252 |
| 2013/0308715 A1* | 11/2013 | Nam | .................... | H04B 7/0469 375/267 |

OTHER PUBLICATIONS

61649022 Provisional Specification.*
3GPP TSG RAN WG1 meeting #66bis, Zhuhai, China, Oct. 10-14, 2011, R1-112896, "Framework for multi-point CSI feedback enhancements for CoMP", Huawei, HiSilicon, 9 pgs.
3GPP TSG RAN WG1 meeting #67, San Francisco, USA, Nov. 14-18, 2011, R1-114094, "Benefits of inter-CSI-RS-resource feedback", Huawei, HiSilicon, 7 pgs.
3GPP TSG RAN WG1 Meeting #67, San Francisco, USA, Nov. 14-18, 2011, R1-114096, "CSI feedback enhancement and evaluation for Scenario C", Huawei, HiSilicon, 7 pgs.
3GPP TSG-RAN WG1 #68, Dresden, Germany, Feb. 6-10, 2012, R1-120203, "Performance analysis of per CSI-RS resource feedback for JT CoMP", Intel Corp., 4 pgs.
3GPP TSG-RAN WG1 Meeting #68bis, Jeju, Korea, Mar. 24-30, 2012, R1-121272, "UE transparent inter-TP phase feedback", Nokia, Nokia Siemens Networks, 3 pgs.
3GPP TS 36.211 V10.4.0 (Dec. 2011), "$3^{rd}$ Generation Partnership Project; Technical Specification Group Radio Access Network; Evolved Universal Terrestrial Radio Access (E-UTRA); Physical Channels and Modulation (Release 10)", 101 pgs.
3GPP TS 36.300 V11.0.0 (Dec. 2011), "$3^{rd}$ Generation Partnership Project; Technical Specification Group Radio Access Network; Evolved Universal Terrestrial Radio Access (E-UTRA) and Evolved Universal Terrestrial Radio Access Network (E-UTRAN); overall description; stage 2, (Release 11)", 194 pgs.
3GPP TS 36.331 V10.4.0 (Dec. 2011), "$3^{rd}$ Generation Partnership Project; Technical Specification Group Radio Access Network; Evolved Universal Terrestrial Radio Access (E-UTRA); Radio Resource Control (RRC); Protocol specification (Release 10)", 296 pgs.

* cited by examiner

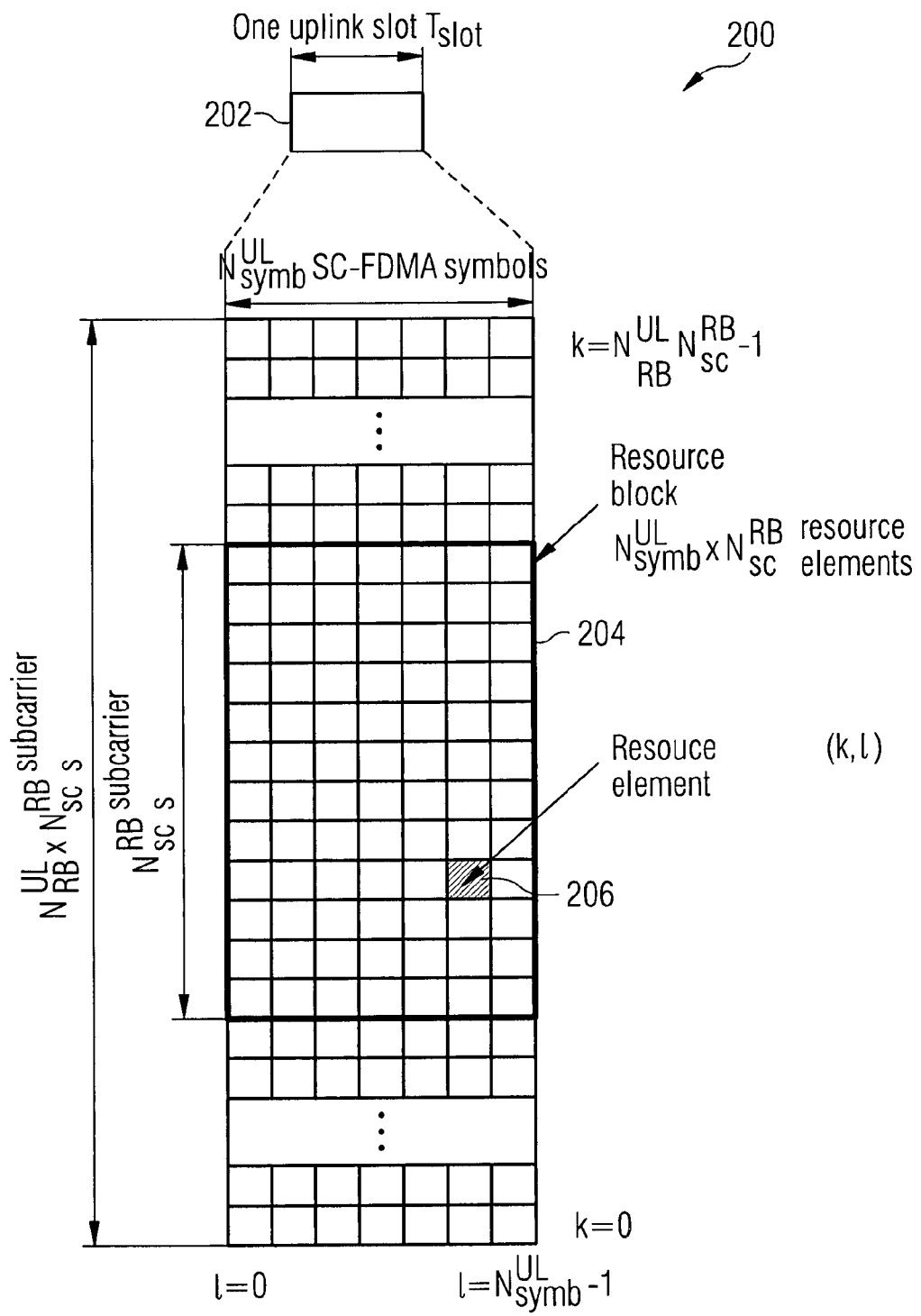

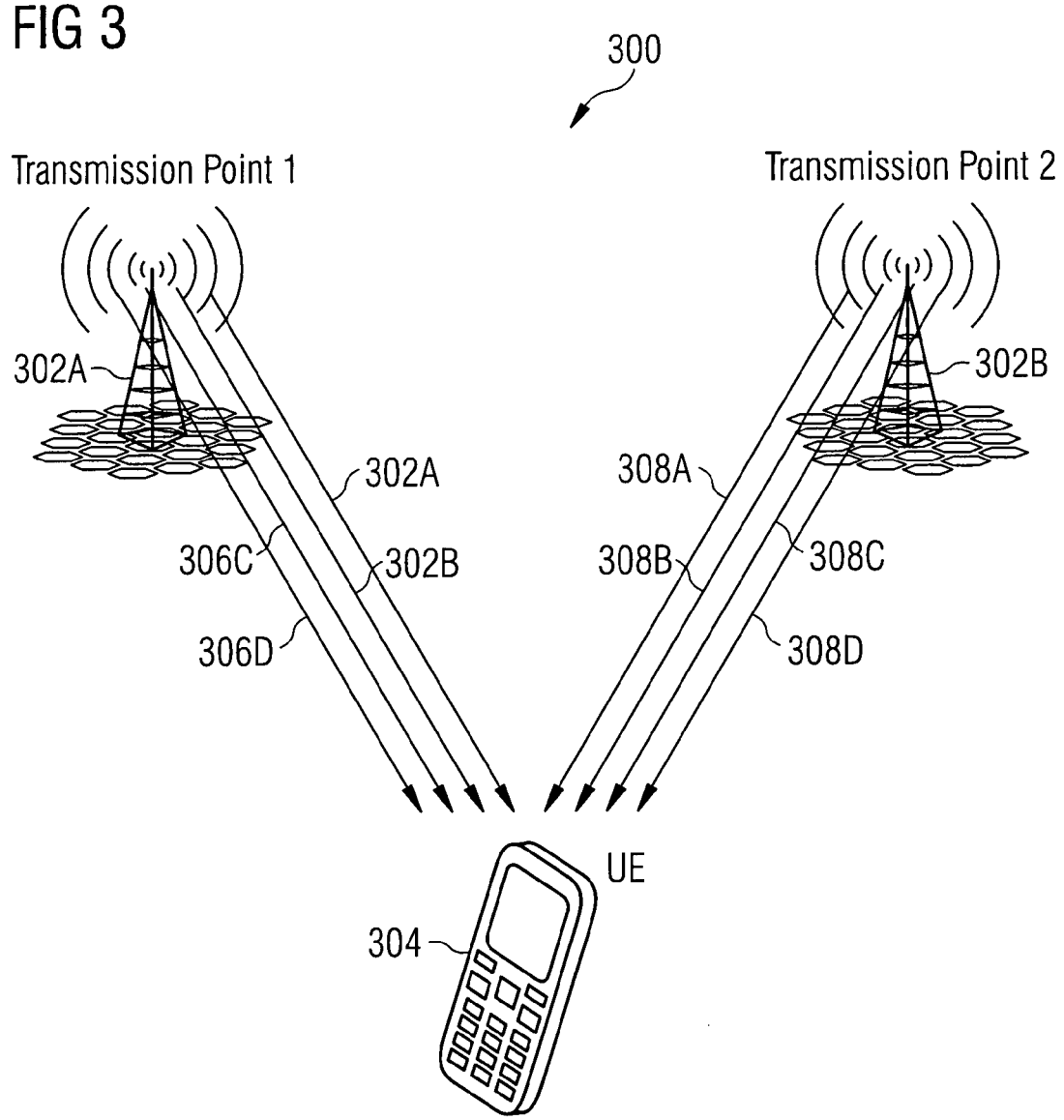

FIG 5

| CSI reference signal configuration | | Number of CSI reference signals configured | | | | | |
|---|---|---|---|---|---|---|---|
| | | 1 or 2 | | 4 | | 8 | |
| | | (k', l') | $n_S$ mod 2 | (k', l') | $n_S$ mod 2 | (k', l') | $n_S$ mod 2 |
| Frame structure type 1 and 2 | 0 | (9, 5) | 0 | (9, 5) | 0 | (9, 5) | 0 |
| | 1 | (11, 2) | 1 | (11, 2) | 1 | (11, 2) | 1 |
| | 2 | (9, 2) | 1 | (9, 2) | 1 | (9, 2) | 1 |
| | 3 | (7, 2) | 1 | (7, 2) | 1 | (7, 2) | 1 |
| | 4 | (9, 5) | 1 | (9, 5) | 1 | (9, 5) | 1 |
| | 5 | (8, 5) | 0 | (8, 5) | 0 | | |
| | 6 | (10, 2) | 1 | (10, 2) | 1 | | |
| | 7 | (8, 2) | 1 | (8, 2) | 1 | | |
| | 8 | (6, 2) | 1 | (6, 2) | 1 | | |
| | 9 | (8, 5) | 1 | (8, 5) | 1 | | |
| | 10 | (3, 5) | 0 | | | | |
| | 11 | (2, 5) | 0 | | | | |
| | 12 | (5, 2) | 1 | | | | |
| | 13 | (4, 2) | 1 | | | | |
| | 14 | (3, 2) | 1 | | | | |
| | 15 | (2, 2) | 1 | | | | |
| | 16 | (1, 2) | 1 | | | | |
| | 17 | (0, 2) | 1 | | | | |
| | 18 | (3, 5) | 1 | | | | |
| | 19 | (2, 5) | 1 | | | | |
| Frame structure type 2 only | 20 | (11, 1) | 1 | (11, 1) | 1 | (11, 1) | 1 |
| | 21 | (9, 1) | 1 | (9, 1) | 1 | (9, 1) | 1 |
| | 22 | (7, 1) | 1 | (7, 1) | 1 | (7, 1) | 1 |
| | 23 | (10, 1) | 1 | (10, 1) | 1 | | |
| | 24 | (8, 1) | 1 | (8, 1) | 1 | | |
| | 25 | (6, 1) | 1 | (6, 1) | 1 | | |
| | 26 | (5, 1) | 1 | | | | |
| | 27 | (4, 1) | 1 | | | | |
| | 28 | (3, 1) | 1 | | | | |
| | 29 | (2, 1) | 1 | | | | |
| | 30 | (1, 1) | 1 | | | | |
| | 31 | (0, 1) | 1 | | | | |

FIG 6

| CSI-RS config | Transmission Point 1 (TP1) | | | | Transmission Point 2 (TP2) | | | |
|---|---|---|---|---|---|---|---|---|
| | Ant1_TP1 | Ant2_TP1 | Ant3_TP1 | Ant4_TP1 | Ant1_TP2 | Ant2_TP2 | Ant3_TP2 | Ant4_TP2 |
| CSI-RS_TP1, e.g. 4TX CSI-RS config 1¹ | Port15_1 | Port16_1 | Port17_1 | Port18_1 | | | | |
| CSI-RS_TP2, e.g. 4TX CSI-RS config 2² | | | | | Port15_2 | Port16_2 | Port17_2 | Port18_2 |

602 — row 1
604 — row 2
600

FIG 7

| CSI-RS config | Transmission Point 1 (TP1) | | | | Transmission Point 2 (TP2) | | | |
|---|---|---|---|---|---|---|---|---|
| | Ant1_TP1 | Ant2_TP1 | Ant3_TP1 | Ant4_TP1 | Ant1_TP2 | Ant2_TP2 | Ant3_TP2 | Ant4_TP2 |
| 702 — CSI-RS_TP1, e.g. 4TX CSI-RS config 1* | Port15_1 | Port16_1 | Port17_1 | Port18_1 | | | | |
| 704 — CSI-RS_TP2, e.g. 4TX CSI-RS config 2* | | | | | Port15_2 | Port16_2 | Port17_2 | Port18_2 |
| 706 — CSI-RS_TP1_2, e.g. 2TX CSI-RS config 3* | Port15_3 | | | | Port16_3 | | | |

| Codebook index | Number of layers υ | |
| --- | --- | --- |
| | 1 | 2 |
| 0 | $\frac{1}{\sqrt{2}}\begin{bmatrix}1\\1\end{bmatrix}$ | $\frac{1}{\sqrt{2}}\begin{bmatrix}1&0\\0&1\end{bmatrix}$ |
| 1 | $\frac{1}{\sqrt{2}}\begin{bmatrix}1\\-1\end{bmatrix}$ | $\frac{1}{2}\begin{bmatrix}1&1\\1&-1\end{bmatrix}$ |
| 2 | $\frac{1}{\sqrt{2}}\begin{bmatrix}1\\j\end{bmatrix}$ | $\frac{1}{2}\begin{bmatrix}1&1\\j&-j\end{bmatrix}$ |
| 3 | $\frac{1}{\sqrt{2}}\begin{bmatrix}1\\-j\end{bmatrix}$ | — |

FIG 9
900

| Codebook index | Weight Ant 1 w1=PMI (port15_3) | Weight Ant 2 w2=PMI (port16_3) | Phase difference arg {w1/w2} |
| --- | --- | --- | --- |
| 0 | 1/sqrt(2) | 1/sqrt(2) | 0 |
| 1 | 1/sqrt(2) | -1/sqrt(2) | pi |
| 2 | 1/sqrt(2) | j/sqrt(2) | -pi/2 |
| 3 | 1/sqrt(2) | -j/sqrt(2) | pi/2 |

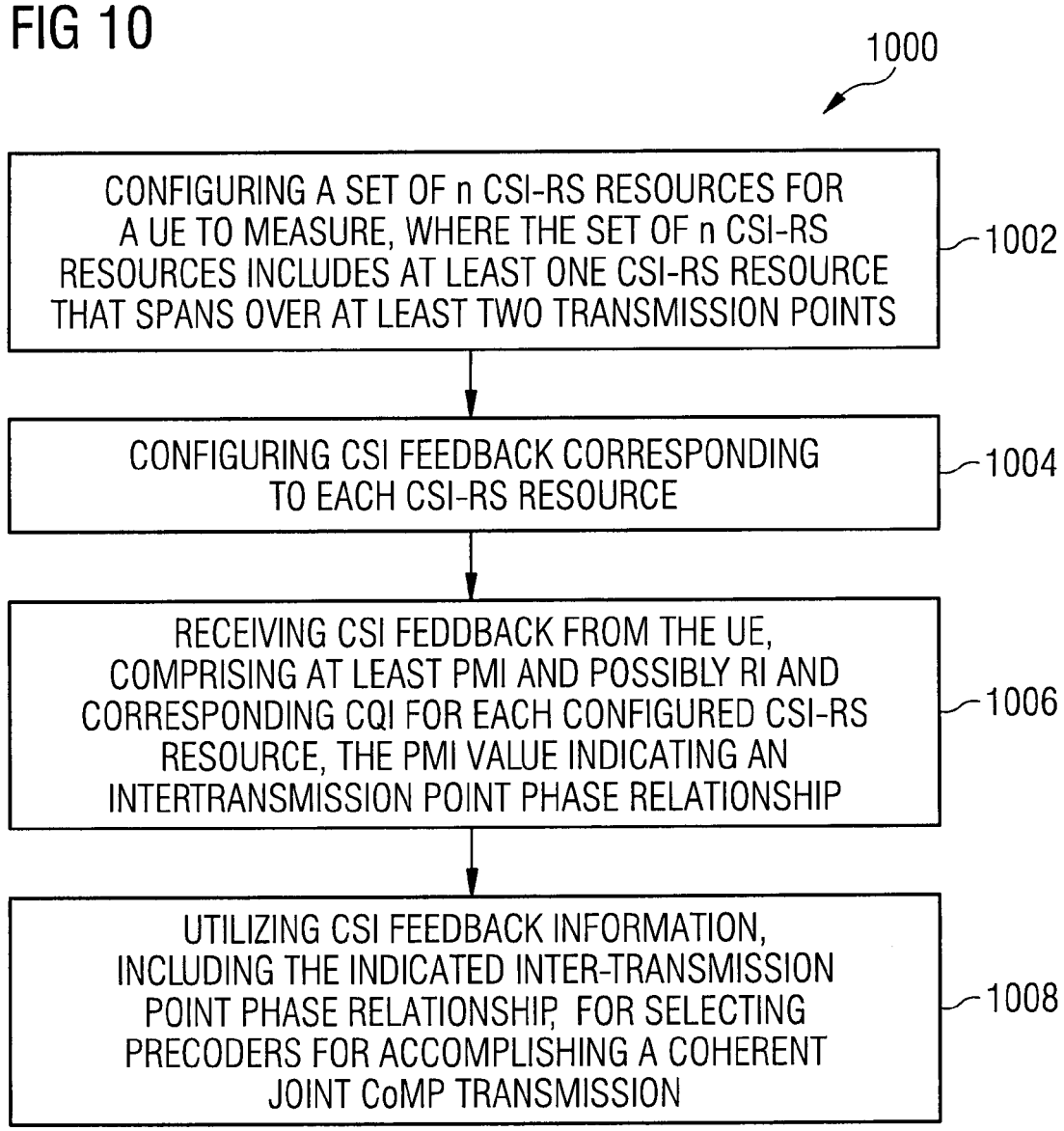

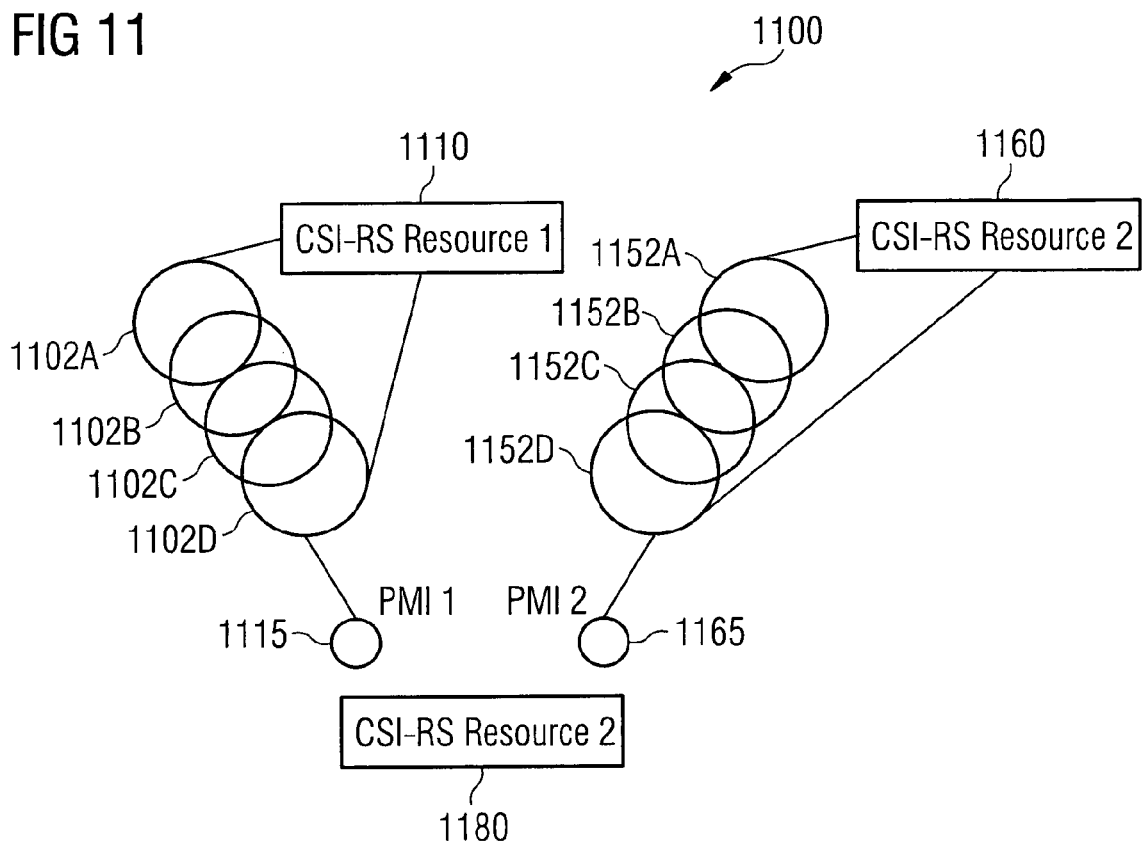

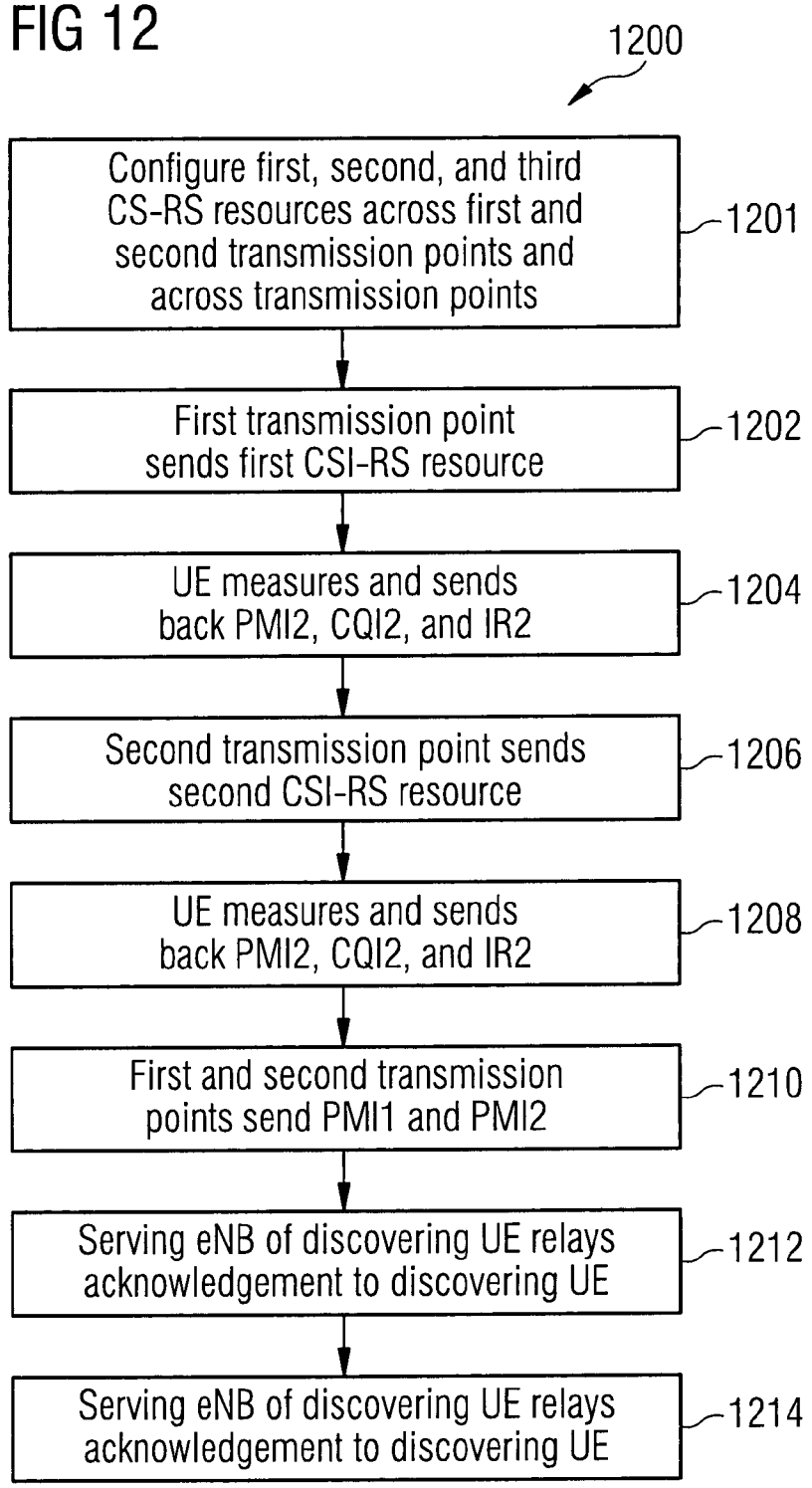

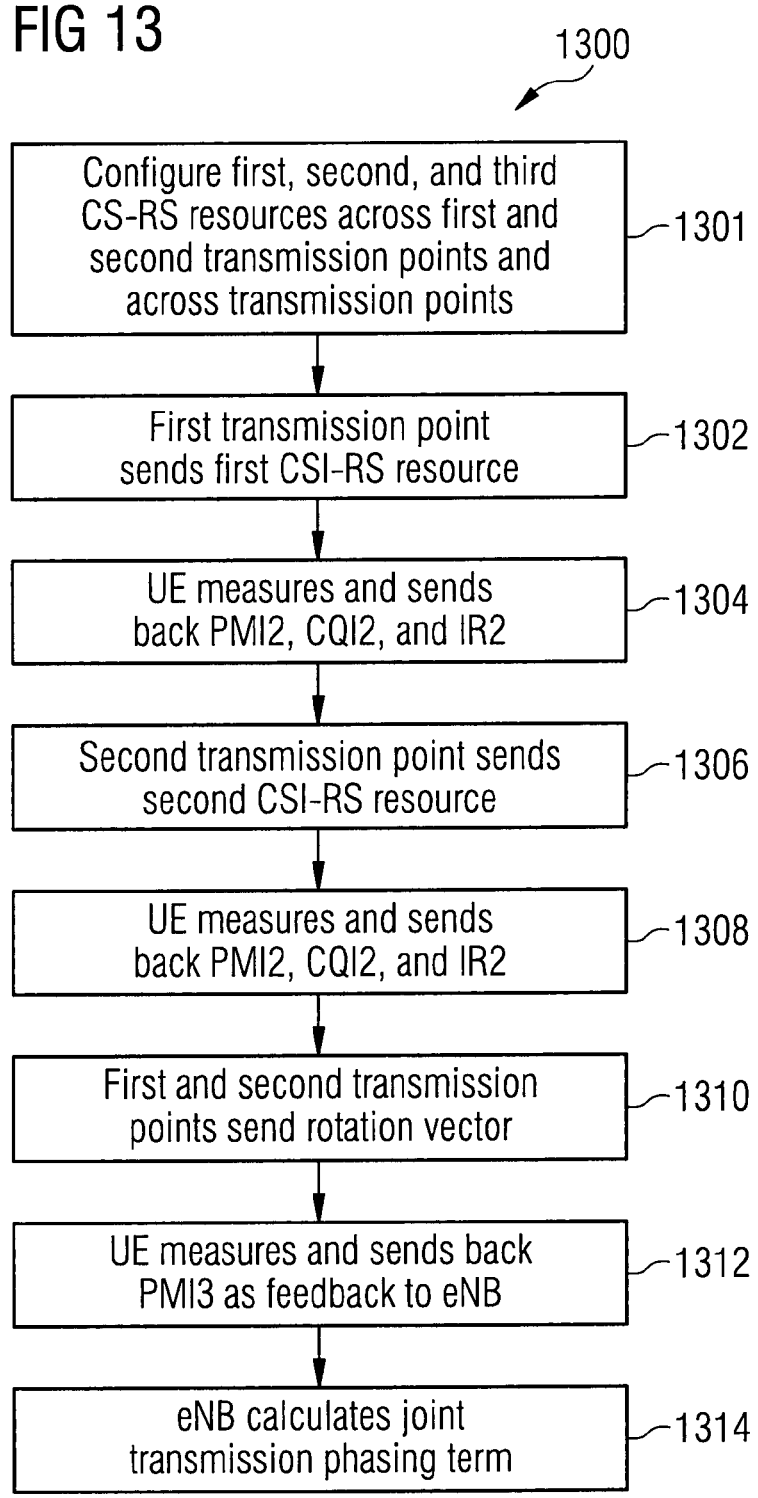

METHOD AND APPARATUS PROVIDING INTER-TRANSMISSION POINT PHASE RELATIONSHIP FEEDBACK FOR JOINT TRANSMISSION COMP

This is a national stage application under 35 U.S.C. 371, of International Application Number PCT/EP2013/066475, filed on Aug. 6, 2013, which claims priority from U.S. provisional application No. 61/679,954, filed on Aug. 6, 2012.

CROSS-REFERENCE TO RELATED APPLICATIONS

This patent application claims priority from International Patent Application No. PCT/IB2013/052044, filed 14 Mar. 2013 and claiming priority from Provisional Patent Application No.: 61/610,560 filed Mar. 14, 2012, and from Provisional Patent Application No. 61/679,954 filed Aug. 6, 2012, the disclosure of which are incorporated by reference herein in their entirety.

TECHNICAL FIELD

The exemplary and non-limiting embodiments of this invention relate generally to wireless communication systems, methods, devices and computer programs and, more specifically, relate to coordinated multipoint (CoMP) transmission and reception techniques, such as those proposed for long term evolution (LTE) advanced (LTE-A), including coherent joint transmission (JT) CoMP techniques, and to resource allocation such as channel state information (CSI) and reference signal (RS) allocation and related feedback from a user equipment (UE) to a network transmission point, such as an evolved NodeB or more simply an eNB.

BACKGROUND

This section is intended to provide a background or context to the invention that is recited in the claims. The description herein may include concepts that could be pursued, but are not necessarily ones that have been previously conceived, implemented or described. Therefore, unless otherwise indicated herein, what is described in this section is not prior art to the description and claims in this application and is not admitted to be prior art by inclusion in this section.

In 3GPP LTE the eNB allocates physical layer resources for uplink (UL, to the eNB) and downlink (DL, from the eNB) shared channels. The physical layer resources include physical resource blocks (PRB) and a modulation coding scheme (MCS). The MCS determines the bit rate, and thus the capacity, of the PRBs. Allocations may be valid for one or more transmission time intervals (TTIs).

Coordinated MultiPoint (CoMP) transmission and reception is being investigated for 3GPP LTE-A to enhance cell-edge data rates in order to create a more uniform data rate experience for the end-user over the entire cell area. CoMP techniques involve increased collaboration between different network nodes (eNBs or more generically 'transmission points') in downlink (DL) transmission to the UE and in uplink (UL) reception from the UE.

SUMMARY OF THE INVENTION

In one embodiment of the invention, an apparatus comprises at least one processor and memory storing a program of instructions. The memory storing the program of instructions is configured to, with the at least one processor, cause the apparatus to at least compute a co-phasing coefficient value for maximizing signal to noise ratio of a composite channel for transmission to a user device, the composite channel comprising first and second transmission points. Computing the co-phasing value comprises receiving first, second, and third precoding matrix indicators, wherein the third precoding matrix indicator is computed based on transmission of the first and second precoding matrix indicators over a joint channel state information reference signal resource from first and second transmission points and calculating the co-phasing coefficient value based on the first, second, and third precoding matrix indicators. the first and second precoding matrix indicators are computed based on feedback by a user device based, respectively, on transmissions of first and second channel state information reference resources from first and second transmission points, respectively.

In another embodiment of the invention, a method comprises computing a co-phasing coefficient value for maximizing signal to noise ratio of a composite channel for transmission to a user device, the composite channel comprising first and second transmission points. Computing the co-phasing value comprises receiving first, second, and third precoding matrix indicators, wherein the third precoding matrix indicator is computed based on transmission of the first and second precoding matrix indicators over a joint channel state information reference signal resource from first and second transmission points and calculating the co-phasing coefficient value based on the first, second, and third precoding matrix indicators. The first and second precoding matrix indicators are computed based on feedback by a user device based, respectively, on transmissions of first and second channel state information reference resources from first and second transmission points, respectively.

In another embodiment of the invention, a computer readable medium stores a program of instructions. Execution of the program of instructions by the processor configures an apparatus to at least compute a co-phasing coefficient value for maximizing signal to noise ratio of a composite channel for transmission to a user device, the composite channel comprising first and second transmission points. Computing the co-phasing value comprises receiving first, second, and third precoding matrix indicators, wherein the third precoding matrix indicator is computed based on transmission of the first and second precoding matrix indicators over a joint channel state information reference signal resource from first and second transmission points and calculating the co-phasing coefficient value based on the first, second, and third precoding matrix indicators. The first and second precoding matrix indicators are computed based on feedback by a user device based, respectively, on transmissions of first and second channel state information reference resources from first and second transmission points, respectively.

In another embodiment of the invention, a method comprises configuring a two-port channel state information reference signal resource across two cells of a wireless cellular network, wherein the two ports are first and second ports, and wherein first and second precoding vectors, respectively, are used for transmission on the first and second ports of the resource and deriving a co-phasing factor for cooperative multipoint transmission based on the transmitted precoders.

BRIEF DESCRIPTION OF THE DRAWINGS

FIG. 2A illustrates an uplink resource grid showing a resource configuration that may be used in systems according to embodiments of the present invention, and shows the relationship of single carrier frequency-division multiple access (SC-FDMA) symbols, subcarriers, resource blocks and resource elements.

FIG. 3 illustrates joint transmission cooperative multi-point operation by elements that may be used in an embodiment of the present invention.

FIG. 5 presents a table showing mapping from a channel state information (CSI) reference signal configuration to (k',l') for a normal cyclic prefix.

FIG. 6 illustrates a prior-art channel state information reference signal (CSI-RS) configuration for two transmission points (TP1 and TP2).

FIG. 7 illustrates a channel state information reference signal (CSI-RS) configuration Table illustrating configuration of an additional two transmission port CSI-RS resource shared by two transmission points as compared to the approach illustrated in FIG. 5.

FIG. 8 presents an exemplary codebook for transmission on antenna ports {0,1} and for channel state information (CSI) reporting based on antenna ports {0,1} or {15,16}.

FIG. 9 illustrates an exemplary use of precoding matrix indicator (PMI) feedback for indication of a phase difference between two antennas each associated with one transmission point of a pair of transmission points.

FIG. 10 illustrates a process according to one or more embodiments of the present invention.

FIG. 11 illustrates a transmission point configuration according to one or more embodiments of the present invention.

FIG. 12 illustrates a process according to one or more embodiments of the present invention.

FIG. 13 illustrates a process 1300 according to this alternative embodiment of the invention.

DETAILED DESCRIPTION

One modern communication system is known as evolved UTRAN (E-UTRAN, also referred to as UTRAN-LTE or as E-UTRA). In this system the downlink (DL) access technique is OFDMA, and the uplink (UL) access technique is SC-FDMA.

One specification of interest is 3GPP TS 36.300 V11.0.0 (2011-12) Technical Specification 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 11).

Figure 1:
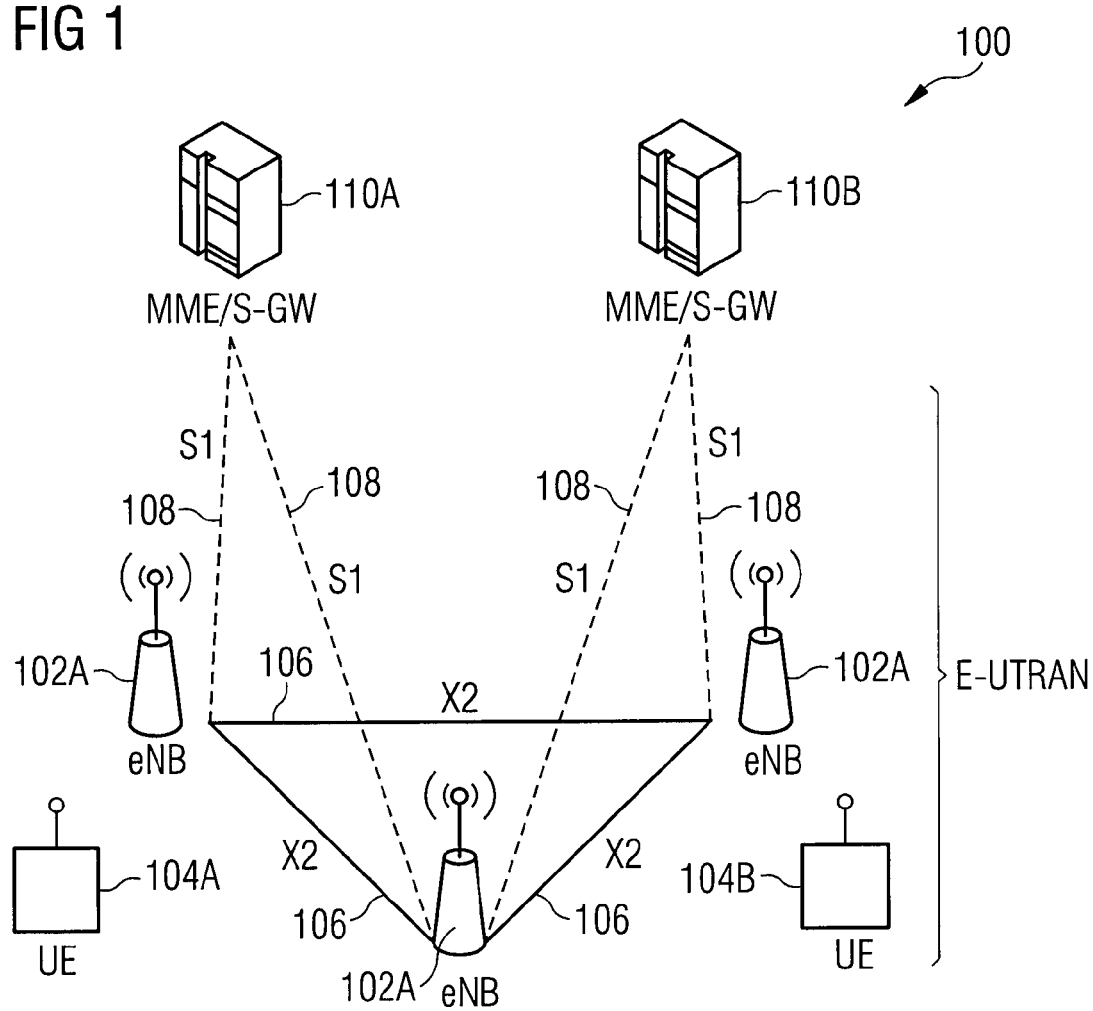
FIG. 1 illustrates a wireless network that may be configured according to an embodiment of the present invention.

FIG. 1 illustrates the overall architecture a system 100, such as a E-UTRAN system, in which one or more embodiments of the present invention may be used. The system 100 includes network access nodes or base stations which may be implemented in the form of eNodeBs (eNBs) 102A, 102B, and 102C, and which may provide an E-UTRAN user plane and control plane (radio resource control (RRC)) protocol terminations towards user devices, which in an embodiment may be implemented as user equipments (UEs), here UEs 104A and 104B. The eNBs 102A-102C may be interconnected with one another by means of an X2 interface 106. In addition or as an alternative to using the logical X2 interface, for cooperative multi-point (CoMP) operation, other inter-transmission point connections such as optical ox other non-standardized low-latency, high capacity interfaces may be used. The eNBs 102A-102C may also be connected by means of an S1 interface to an evolved packet core (EPC). In an embodiment, the connection may take the form of S1 mobility management entity (S1 MME) interface 108 to MME serving gateways (MME/S-GWs) 110A and 110B. The S1 interface 108 supports a many-to-many relationship between MMEs, S-GWs and eNBs.

Uplink and downlink frames (of 10 msec duration) are defined in 3GPP TS 36.211 V10.4.0 (2011-12) Technical Specification 3rd Generation Partnership Project; Technical Specification Group Radio Access Network; Evolved Universal Terrestrial Radio Access (E-UTRA); Physical Channels and Modulation (Release 10). FIG. 2A illustrates an uplink resource grid 200 presenting an exemplary definition of resources that may be used in a system such as the system 100 of FIG. 1, and showing the relationship of SC-FDMA symbols, subcarriers, resource blocks and resource elements. The grid comprises a plurality of uplink slots, exemplified by the slot 202, which is a time slot. One or more of the uplink slots may carry single carrier frequency-division multiple access (SC-FDMA) symbols, and the grid may be arranged horizontally from l=0 to some maximum, which in the present example may be $1=(N_{symb}^{UL})-1$, and from k=0 to some maximum, which in the present example may be $k=(N_{RB}^{UL})(N_{sc}^{RB})-1$. The grid may comprise a resource block comprising, for example, a number $(N_{symb}^{UL})(N_{sc}^{RB})$ of resource elements. The overall grid may comprise $(N_{RB}^{UL})(N_{sc}^{RB})$ subcarriers, while the resource block may comprise $(N_{sc}^{RB})$ subcarriers.

Figure 2B:
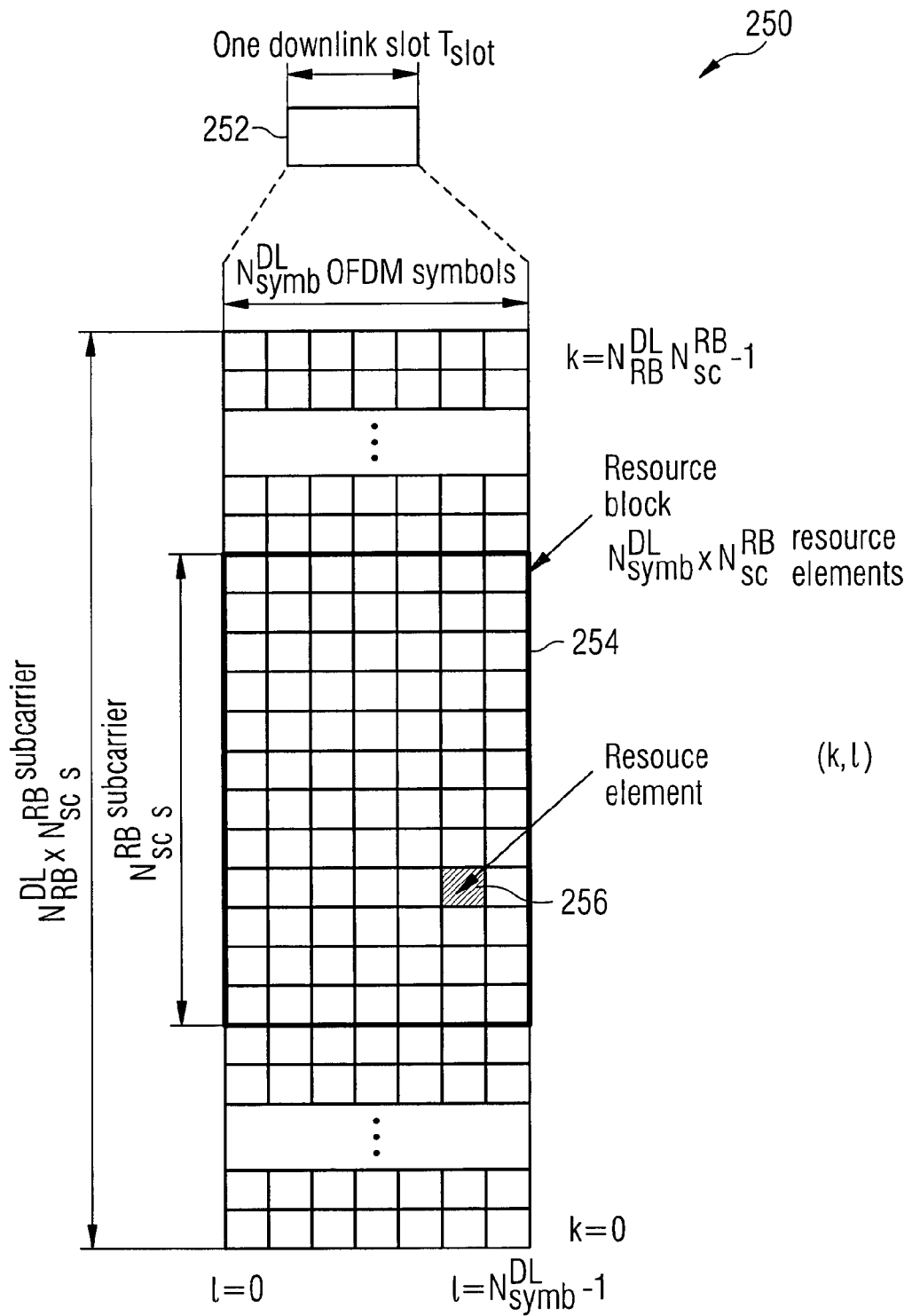
FIG. 2B illustrates an uplink resource grid showing a resource configuration that may be used in systems according to embodiments of the present invention, and shows the relationship of orthogonal frequency-division multiplexing (OFDM) symbols, subcarriers, resource blocks and resource elements.

FIG. 2B illustrates a downlink resource grid, showing the relationship of OFDM symbols, subcarriers, resource blocks and resource elements. The resource blocks can be referred to as physical resource blocks (PRBs). The grid comprises a plurality of downlink slots, exemplified by the slot 252, which is a time slot. One or more of the downlink slots may carry orthogonal frequency-division multiplexing (OFDM) symbols, and the grid may be arranged horizontally from l=0 to some maximum, which in the present example may be $1=(N_{symb}^{RDL})-1$, and from k=0 to some maximum, which in the present example may be $k=(N_{RB}^{DL})(N_{sc}^{RB})-1$. The grid may comprise a resource block 204 comprising, for example, a number $(N_{symb}^{RDL})(N_{sc}^{RB})$ of resource elements such as the resource element 206. The overall grid may comprise $(N_{RB}^{DL})(N_{sc}^{RB})$ subcarriers, while the resource block may comprise $(N_{sc}^{RB})$ subcarriers.

One CoMP scheme is referred to as coherent joint transmission (JT) CoMP. In coherent JT CoMP, data is jointly transmitted to a UE from multiple transmission points. Based on CSI feedback from the UE a base station such as an eNB is able to precode the data so that the received signal quality (for example, signal to interference plus noise ratio (SINR), throughput, or both, or some alternative or additional characteristic or combination of characteristics) is maximized. To provide the information needed to accomplish this precoding, the eNB needs to be able to obtain information not only about a preferred precoder for each participating transmission point, but also information descriptive of a phase difference between the cooperating transmission points in order to optimize the JT CoMP performance.

One general example of the operation of JT CoMP is illustrated in FIG. 3. Multiple (two in this non-limiting example) transmission points 302A and 302B send data to a UE 304 using the same time-frequency resources, which may, for example, be physical resource blocks defined in formats similar to those illustrated in FIGS. 2A and 2B. The two transmission points 302A and 302B may each be equipped with multiple transmit antennas (which in a non-limiting example may be four). The transmission points 302A and 302B may or may not belong to the same cell—that is, they may have the same or a different physical cell identifier (ID). The transmission point 302A transmits signals 306A-306D from its four antennas, and the transmission point 302B transmits signals 308A-308D from its four antennas.

One or more embodiments of the invention provide mechanisms for aligning the phases of the signals transmitted from each of the transmission points. Transmissions are referred to as "coherent" when their phases are aligned. Such alignment of phases aids in achieving the best possible performance for communication with the UE. If the transmissions are not phase aligned (coherent) then there is a possibility that the signals with opposite phase can cancel each other (destructively interfere) at the UE, resulting in a reduced SINR/throughput and thus reducing any gain that could be achieved by the use of JT CoMP.

One or more embodiments of the invention provide for a simple, efficient technique to provide inter-transmission point phase information to the eNB to enable coherent joint processing for downlink cooperative multipoint (DL CoMP). In one or more embodiments of the invention, providing such phase information is standards-transparent—that is, mechanisms for providing such information can be implemented while following existing standards.

Figure 4:
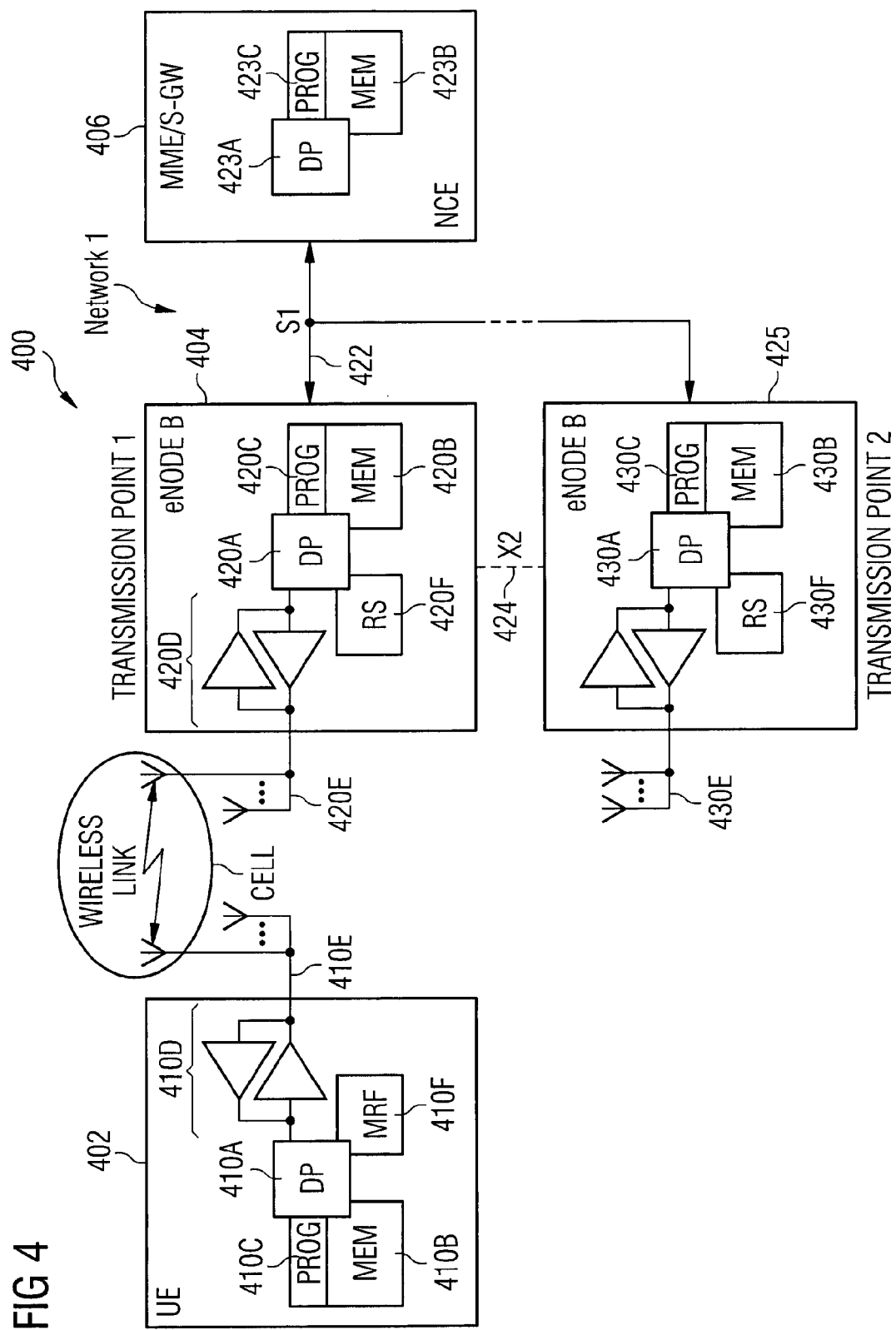
FIG. 4 shows a simplified block diagram of various electronic devices that are suitable for use in practicing embodiments of this invention.

Before describing in further detail the exemplary embodiments of this invention, reference is made to FIG. 4 for illustrating a simplified block diagram of various electronic devices and apparatus that are suitable for use in practicing the exemplary embodiments of this invention. In FIG. 4 a wireless network 400 is adapted for communication over a wireless link with an apparatus, such as a mobile communication device or node which may be referred to as a UE 402, via a network access node, such as a transmission point or Node B (base station), and more specifically an eNB 404. The network 400 may include a network control element (NCE) 406 that may include MME/S-GW functionality similar to that shown in FIG. 1, and which may provide connectivity with a further network, such as a telephone network, a data communications network such as the Internet, both such networks, or additional or alternative networks.

The UE 402 includes a controller, such as at least one computer or a data processor (DP) 410A, at least one non-transitory computer-readable memory medium embodied as a memory (MEM) 410B that stores a program of computer instructions (PROG) 410C, and at least one suitable radio frequency (RF) transmitter and receiver pair (transceiver) 410D for bidirectional wireless communications with the eNB 404 via one or more antennas 410E.

The eNB 404 also includes a controller, such as at least one computer or a data processor (DP) 420A, at least one computer-readable memory medium embodied as a memory (MEM) 420B that stores a program of computer instructions (PROG) 420C, and at least one suitable RF transceiver 420D for communication with the UE 402 via one or more antennas 420E (typically several such as when multiple input/multiple output (MIMO) operation is in use and/or JT CoMP is in use). The NCE includes a controller, such as at least one computer or a data processor (DP) 421A, at least one computer-readable memory medium embodied as a memory (MEM) 421B that stores a program of computer instructions (PROG) 421C. The eNB 404 is coupled via a data/control path 422 to the NCE 406. The path 422 may be implemented as an S1 interface similar to that illustrated in FIG. 1. The eNB 404 may also be coupled to another eNB via data/control path 424, which may be implemented using an X2 interface similar to that illustrated in FIG. 1, by some high-capacity, low latency connection which may be proprietary and which may use, for example, optical fiber, or through the use of some combination of interfaces such as an X2 interface and a high-capacity low latency connection.

Also shown in FIG. 4 is a second transmission point or network access node, such as a remote radio head (RRH) or a second eNB 425 that establishes a connection with the UE 402. The second eNB 425 may include a DP 430A, memory 430B, and transceiver 430D. The second eNB 425 may establish the connection with the UE 402 via antennas 430E. The second eNB 425 may be connected with the NCE 406 via the path 422, and may be connected to the first eNB 404 via the data/control path 424. The radio access node (e.g., second eNB 425) is shown so as to represent at least one second transmission point that can operate with the first eNB 404 in order to perform JT CoMP with the UE 402 in accordance with certain examples of one or more embodiments of this invention, as described in detail below. The second transmission point (eNB 425) may have the same or a different cell ID than the first transmission point (eNB 404).

For the purposes of describing exemplary embodiments of this invention the UE 402 may be assumed to also include a channel state information-reference signal (CSI-RS) measurement and reporting function (MRF) 410F that is operable with, for example, DL RRC signaling from the eNB 404. RRC signaling is described in, for example, 3GPP TS 36.331 V10.4.0 (2011-12) Technical Specification 3rd Generation Partnership Project; Technical Specification Group Radio Access Network; Evolved Universal Terrestrial Radio Access (E-UTRA); Radio Resource Control (RRC); Protocol specification (Release 10).

The eNB 404 and the eNB 425 may include CSI-RS resource schedulers (RS) 420F, operating in accordance with embodiments of this invention, such as with a non-limiting resource configuration shown in FIG. 5 and discussed in greater detail below in connection with FIG. 5. It will be noted that embodiments of the invention are not limited to use with just one assemblage and arrangement of data. Further, and by example, in data configurations such as that illustrated in FIG. 5, there can be a different number of transmission points represented, and a different number of antennas and ports per transmission point.

It will be noted that a second CSI-RS resource scheduler (RS) 430F could also be present at the second transmission point (eNB 425). Alternatively a joint scheduler can be used. Note that a single baseband (BB) unit could also be used for both the first and second transmission points, or each transmission point could operate with its own associated BB unit. In other words, it should be appreciated that the embodiment shown in FIG. 4 is not be construed in a limiting sense on the how the exemplary embodiments of this invention can be implemented and instantiated.

At least the programs 410C, 420C, 421C, and 430C may be assumed to include program instructions that, when executed by the associated data processors 410A, 420A, 421A, and 430A, enable the device to operate in accordance with the embodiments of this invention, as will be discussed below in greater detail. In general, the embodiments of this invention may be implemented at least in part by computer software executable by the DP 400A of the UE 402 and/or by the DP 420A of the eNB 404, and/or by the DP 421A of the NCE 406, and/or by the DP 430A of the eNB 425, or by hardware, or by a combination of software and hardware (and firmware).

The various data processors, memories, programs, transceivers and interfaces depicted in FIG. 4 can all be considered to represent means for performing operations and functions that implement the several non-limiting aspects and embodiments of this invention.

In general, the various embodiments of the UE 402 can include, but are not limited to, cellular mobile devices, smartphones, personal digital assistants (PDAs) having wireless communication capabilities, portable computers having wireless communication capabilities, image capture devices such as digital cameras having wireless communication capabilities, gaming devices having wireless communication capabilities, music storage and playback appliances having wireless communication capabilities, Internet appliances permitting wireless Internet access and browsing, as well as portable units or terminals that incorporate combinations of such functions.

The computer-readable memories 410B, 420B, 421B, and 430B may be of any type suitable to the local technical environment and may be implemented using any suitable data storage technology, such as semiconductor based memory devices, random access memory, read only memory, programmable read only memory, flash memory, magnetic memory devices and systems, optical memory devices and systems, fixed memory and removable memory. The data processors 410A, 420A, 421A, and 430A may be of any type suitable to the local technical environment, and may include one or more of general purpose computers, special purpose computers, microprocessors, digital signal processors (DSPs) and processors based on multi-core processor architectures, as non-limiting examples.

Discussing now in greater detail examples of embodiments of this invention, in 3GPP terminology a transmission point (e.g., the eNB 404) is visible to the UE 402 as a channel state information-reference signal (CSI-RS) resource, assuming that the network is configuring different CSI-RS resources for each of the transmission points involved in the CoMP operation. However, the UE 402 is not aware of whether and how the different CSI-RS resources belong to different transmission points. The eNB 404 may configure the MRF 410E of the UE 402 to perform CSI measurements and to report measurement results based on one or more CSI-RS resources. This provides at least the RS 420F of the eNB 404 with information necessary to schedule data transmission (i.e., to select the CoMP transmission mode such as JT as well as to determine the appropriate physical resources and/or precoding weights) from any of the transmission points.

One or more embodiments of the invention provide for mechanisms for obtaining inter-transmission point phase information.

Consider the case of the two transmission points TP1 and TP2 (for example, eNB 404 and eNB 430 in FIG. 4) each having 4 transmit (TX) antennas 420E as was shown in FIG. 4. The network would configure the UE 402 to measure CSI from two different CSI-RS resource configurations, denoted here with CSI-RS_TP1 and CSI-RS_TP2 for TP1 and TP2, respectively. As each TP has 4 TX antennas 420E the individual CSI-RS resource configurations need to contain 4 CSI-RS signals and should be selected in such a manner that they do not use the same resource elements. This can be achieved by selecting a different CSI-RS resource configuration from a table such as the table 500 illustrated in FIG. 5, which presents definitions of cross-reference signal configurations, and may be used as a cross-reference table between configuration identifiers and their definitions. Such definitions may follow, for example, Section 6.10.5, CSI reference signals, of 3GPP TS 36.211

For example, suppose that CSI-RS resource configurations 1 and 2 of the table 500 of FIG. 5, are selected. These CSI-RS configurations indicate different resource elements. Each of the CSI-RS resource configurations for the two TPs contains 4 CSI reference signals according to a 4 TX configuration. The CSI reference signals are denoted here as:

CSI-RS_TP1={port15_1, port16_1, port17_1, port18_1} for the antennas Ant1_TP1 to Ant4_TP1
CSI-RS_TP2={port15_2, port16_2, port17_2, port18_2} for the antennas Ant1_TP2 to Ant4_TP2.

This can be logically denoted in the exemplary Table 600 shown in FIG. 6, wherein the entry 602 follows CSI-RS configuration 1 presented in FIG. 5 and wherein the entry 604 follows CSI-RS configuration 2 presented in FIG. 5

It is currently considered in 3GPP (for example, as in R1-114094 and in other proposals), that a UE such as the UE 402 would report the following:

1. CSI1 based on CSI-RS_TP1 (CSI for the TP1)
2. CSI2 based on CSI-RS_TP2 (CSI for TP2)
3. Inter-CSI-RS phase between CSI-RS_TP1 and CSI-RS_TP2—namely the phase relationship between one of the antenna ports of the two CSI-RS configurations, i.e., the phase offset of port15_1/ant1_TP1 and port15_2/ant1_TP2 quantized, e.g., to a 4 phase state/QPSK alphabet.

One significant issue with such an approach is that such a measurement is fundamentally quite different from those defined in the current 3GPP specification from at least a RAN4 test specification point of view. For example, it is unclear how the reliability of this proposed type of phase-only measurement could be verified with the current RAN4 test methodologies. Currently, the performance requirement—that is, the definition for the CSI accuracy—is such that when scheduled according to the recommended CSI (including CQI, pre-coding matrix indicator (PMI) and rank indicator (RI)), the physical uplink shared channel (PDSCH) block error rate shall not exceed 10%. This is given only for the full CSI of a single CSI-RS resource containing—for example, the RI, PMI and the corresponding CQI. That is, the feedback from the UE 402 needs to be sufficient to achieve a certain overall data throughput, but need not be sufficient to enable a separate evaluation of the accuracy of the RI, PMI and CQI feedback. Standardization of such a measurement would call for a significant amount of effort, while also complicating the implementation of the UE 402.

One or more embodiments of the invention, therefore, provide a network implementation-based method that allows for the network to perform robust coherent joint transmission DL CoMP by providing an eNB such as the eNB 404 of FIG. 4 with information that is needed regarding the phase relationship between different transmission points, and to accomplish this task without a need to standardize a completely new measurement and test methodology in 3GPP, or a need to standardize new required configuration signaling. One or more embodiments of the invention also provide for one or more UE designs or configurations providing directed to enabling the network to perform DL CoMP.

One or more exemplary embodiments of the present invention use CSI-RS resource configuration in a novel manner, so as to cause a UE such as the 402 to feedback inter-transmission point phase information to an eNB such as the eNB 404 while using existing codebooks. The goal is to make the inter-transmission point feedback transparent or substantially transparent to a UE such as the UE 402 without requiring any changes to specifications beyond any changes needed to allow CoMP in general. Measures for CoMP include, for example, the possibility to configure more than a single CSI-RS resource and or configure CSI feedback from more than a single CSI-RS resource. Embodiments do not present a need for new "phase measurement" specification effort.

Exemplary embodiments of this invention in one aspect thereof configure one additional CSI-RS resource that spans one of the antennas (e.g., CSI-RS_TP12) in each of the participating (e.g., two) transmission points in order to obtain from the UE 402 the phase feedback in the same manner as the proposed inter-CSI-RS phase feedback.

In contrast to the example discussed above with reference to FIG. 6 three different CSI-RS resources are configured in the following way for a non-limiting example of using the first antenna of each transmission point (for example, the first antenna of eNB 404 and the first antenna of eNB 425) as a phase reference:

CSI-RS_TP1={port15_1, port16_1, port17_1, port18_1} for the antennas Ant1_TP1 to Ant4_TP1;
CSI-RS_TP2={port15_2, port16_2, port17_2, port18_2} for the antennas Ant1_TP2 to Ant4_TP2; and
CSI-RS_TP1_2={port15_3, port16_3} for the antennas Ant1_TP1 and Ant1_TP2.

The foregoing technique is shown logically in the Table 700 depicted in FIG. 7, wherein the table entries 702, 704, and 706 correspond to the first, second, and third configurations, respectively, defined by the table 500 of FIG. 5.

It can be noted that instead of using the first antenna pair (Ant1_TP1 and Ant1_TP2) from two different transmission points, the CSI-RS_TP1_2 may be configured to comprise some other pair of antennas (for example the second antenna pair, or the third antenna pair) from two different transmission points. Note also that, for example, Ant1_TP1 and Ant2_TP2, etc., could be selected. That is, the antennas selected need not be a complementary pair of antennas from two transmission points. More generally, the antennas selected need not be a complementary set of k antennas from m transmission points, where k is equal to or greater than 2.

FIG. 8 presents a codebook table 800 taking the form of a precoding matrix indicator associating codebook indices with phase information. In the case of Rank=1 reporting for CSI-RS_TP1_2, the phase of the second antenna port in the PMI of the table 800 of FIG. 8 corresponds to the phase to be applied for transmission between the transmission points. The PMI provides phase information between the transmission points, and this phase information may be used for pre-equalization of phase differences by the network because such equalization is needed for coherent transmission. It will be recognized that the QPSK/4 phase state information is exactly contained in the Rank=1 PMI, because the phase difference is given by: argument{PMI(port15_3)/PMI(port16_3)}.

Therefore, for the Rank=1 restriction (that is, for the case in which the number of layers=1) the PMI fed back from the UE 402 contains the inter-transmission point phase feedback information with 2 bits. Reference can also be made to the Table 900 of FIG. 9, which shows one non-limiting example of how the fed back PMI can indicate to the eNB 404 (to the resource scheduler 404E) the phase difference between two antennas, each of which is associated with one transmission point of a pair of transmission points.

The PMI that is fed back basically indicates to the eNB 404 how it should modify the phase of the second antenna so that the transmitted signals become coherently aligned at the UE 402. Thus, and by example, if the phase offset of the second antenna is 90° (=pi/2=j) compared the first antenna (and the UE 402 thus feeds back codebook/PMI index 2), then the eNB 404 is enabled to rotate the phase of the second antenna in the opposite direction (by −90°=−pi/2=−j). The phase difference between the antennas can be derived based on the precoding weight from the first and second antenna by calculating the argument/phase of w1/w2, as shown in the table 900 depicted in FIG. 9. It has been noted that a 2-bit, quadrature phase shift keying (QPSK) alphabet seems to be sufficient to achieve most of the gains from inter-CSI-RS phase reporting.

Examples of the embodiments of this invention may be extended to accommodate the case when, for example, four transmission points are cooperating. In such a case, one antenna port would be again configured for each of the four transmission points and a 4-TX codebook (or a subset) with Rank=1 restriction could be used. Alternatively, and further in accordance with exemplary embodiments of this invention, one 2-antenna port inter-transmission point CSI-RS configuration could be used for each pair of transmission points.

One non-limiting implementation of one or more embodiments of this invention can be summarized with the following steps. Reference is also made to FIG. 10 for showing a logic flow diagram presenting a process that may, for example, illustrate the operation of a method, and a result of execution of computer program instructions, in accordance with the exemplary embodiments of this invention.

At step 1002, a network represented by, for example, the RS 420F of the eNB 404) configures (for example, by RRC signaling) a set of n CSI-RS resources for the UE 402 to measure. The set of n CSI-RS resources includes at least one CSI-RS resource that spans over at least two transmission points, where n is a number greater than the number of cooperating transmission points.

At step 1004, the network also configures CSI feedback corresponding to each CSI-RS resource. This CSI feedback configuration may involve either periodic or aperiodic feedback. The reporting mode and other related parameter (periodicity) may be configured separately for each CSI-RS resource. For the configured inter-transmission point CSI-RS resource or resources, one advantageous configuration is to restrict the reporting to Rank=1 in order for the PMI to reflect the intended phase relationship between the cooperating transmission points.

At step 1006, the UE 402 performs CSI measurements based on the configured CSI-RS resources and transmits (reports) the CSI feedback to the network. The CSI feedback contains, for example, at least the PMI and may contain one or both of the RI and the corresponding CQI. The fed back PMI is received by the network and, in accordance with exemplary embodiments of this invention, indicates to the eNB 404 the inter-transmission point phase relationship.

At step 1008, the network may utilize the CSI feedback information (including the indicated inter-transmission point phase relationship) in the selection of preferred precoders for coherent JT CoMP transmission.

A further aspect of the exemplary embodiments of this invention related to a non-transitory computer-readable medium that contains software program instructions, where execution of the software program instructions by at least one data processor results in performance of operations that comprise the execution of the process shown in FIG. 10 and described above.

The exemplary embodiments of this invention can in one aspect be viewed as being primarily (if not totally) related to the eNB/network implementation, and largely transparent to the UE 10. The use of the exemplary embodiments of this invention enables configuration of the antenna ports in the transmission points to enable the network to perform coherent JT CoMP. In one or more embodiments, of this invention needs only one antenna port per transmission point to be jointly configured to obtain inter-transmission point phase information at the eNB 404, whereas the prior proposals assume all antenna ports need to be taken into account in the calculation.

Exemplary embodiments of this invention provide that the eNB 404 configures the inter-transmission point CSI-RS resource to include one TX antenna in each transmission point. This is significantly different than the prior art, where an aggregated feedback model assumes that all TX antennas in the cooperating transmission points are included in the CSI-RS resource, and where the inter-CSI-RS phase measurement may take all antennas in each transmission point into account.

The TX antennas between which the inter-TP feedback is configured may be of the same orientation—for example, the "first" antenna of each transmission point, and where the 'paired' antennas have, for example, the same polarization (vertical or horizontal).

In operation, the eNB 404 performs transmission by knowing the CSI for transmission point 1(TP1) and the CSI for transmission point 2 (TP2), and the inter-transmission point PMI and the antennas for which the CSI for each transmission point has been calculated. The eNB 404 can then calculate the precoders for coherent JT CoMP from TP1 and TP2 as:

TP1: PMI(CSI-RS_TP1) for TP1; and
TP2: PMI(CSI-RS_TP2)*PMI(port16_3)/PMI3 (port15_3) for TP2.

Through the use of exemplary embodiments of this invention it becomes possible for an eNB designer to provide for coherent JT CoMP by applying an intelligent configuration of CSI-RS resources as well as transmitter algorithms without requiring explicit specification support.

The benefits, advantages and technical effects made possible by the use of these exemplary embodiments may include at least the following. For example, the invention provides in one aspect thereof a standards-transparent solution to enable coherent JT CoMP with no added implementation complexity for the UE 402, and with no additional standardization effort. In practice the UE 402 does not need to know that it should actually perform a specific phase measurement for coherent joint transmission, as exactly the same CSI measurement can be applied as with conventional multi-input-multi-output (MIMO) operation.

Furthermore, the use of the exemplary embodiments of this invention enables different reporting granularities (in the frequency/PRB domain) or periodicities (in the time domain) to be configured for the intra-transmission point feedback and for the inter-transmission point feedback, allowing the signaling overhead to be optimized.

Note that while an additional CSI-RS resource needs to be configured to the UE 402, this incurs but a small additional amount of signaling overhead.

The various blocks shown in FIG. 10 and discussed above may be viewed, for example, as method steps, as operations that result from operation of computer program code, as a plurality of logic circuit elements constructed to carry out the associated function or functions, or of some combination of such steps or operations.

In general, the various exemplary embodiments may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto. While various aspects of the exemplary embodiments of this invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

It should thus be appreciated that a further aspect of the exemplary embodiments of this invention is an apparatus that comprises at least one data processor and at least one memory that includes computer program code. The at least one memory and computer program code are configured, with the at least one data processor, to cause the apparatus at least to configure a set of n CSI-RS resources for a UE to measure, where the set of n CSI-RS resources includes at least one CSI-RS resource that spans over at least two transmission points. The at least one memory and computer program code are further configured, with the at least one data processor, to also cause the apparatus to configure CSI feedback corresponding to each CSI-RS resource, to receive CSI feedback from the UE, the CSI feedback comprising at least PMI and possibly RI and corresponding CQI for each configured CSI-RS resource. The PMI value indicates an inter-transmission point phase relationship. The at least one memory and computer program code are further configured, with the at least one data processor, to utilize CSI feedback information, including the indicated inter-transmission point phase relationship, for selecting precoders for accomplishing a coherent joint CoMP transmission.

In this apparatus the configured inter-transmission point CSI-RS resource(s) restrict the reporting to Rank=1.

A still further aspect of the exemplary embodiments of this invention is an apparatus that comprise means for configuring a set of n CSI-RS resources for a UE to measure, where the set of n CSI-RS resources includes at least one CSI-RS resource that spans over at least two transmission points. The apparatus further comprises means for configuring the UE for CSI feedback corresponding to each CSI-RS resource and means for receiving CSI feedback from the UE, where the CSI feedback comprises at least PMI and possibly RI and corresponding CQI for each configured CSI-RS resource. The PMI value indicates an inter-transmission point phase relationship. The apparatus further comprises means for utilizing the CSI feedback information, including the inter-transmission point phase relationship that is indicated by the PMI value, for selecting precoders for accomplishing a coherent joint CoMP transmission.

The exemplary embodiments of this invention further encompass a method, an apparatus and a computer program product configured to enable a user equipment to receive a measurement configuration for a set of n CSI-RS resources, where the set of n CSI-RS resources includes at least one CSI-RS resource that spans over at least two transmission points, and to measure and report CSI feedback corresponding to each CSI-RS resource, where the CSI feedback comprises at least PMI and possibly RI and corresponding CQI for each configured CSI-RS resource.

In this method, apparatus and computer program product at least one PMI value that is fed back indicates an inter-transmission point phase relationship for enabling a network resource scheduler function to at least select precoders for accomplishing a coherent joint CoMP transmission to the user equipment.

In this method, apparatus and computer program product the user equipment is restricted to reporting Rank=1.

It should thus be appreciated that at least some aspects of the exemplary embodiments of the inventions may be practiced in various components such as integrated circuit chips and modules, and that the exemplary embodiments of this invention may be realized in an apparatus that is embodied as an integrated circuit. The integrated circuit, or circuits, may comprise circuitry (as well as possibly firmware) for embodying at least one or more of a data processor or data processors, a digital signal processor or processors, base-band circuitry and radio frequency circuitry that are configurable so as to operate in accordance with the exemplary embodiments of this invention.

A still further aspect of the exemplary embodiments of this invention is an apparatus that comprise means for configuring a set of n CSI-RS resources for a UE to measure, where the set of n CSI-RS resources includes at least one CSI-RS resource that spans over at least two transmission points. The apparatus further comprises means for configuring the UE for CSI feedback corresponding to each CSI-RS resource and means for receiving CSI feedback from the UE, where the CSI feedback comprises at least PMI and possibly RI and corresponding CQI for each configured CSI-RS resource. The PMI value indicates an inter-transmission point phase relationship. The apparatus further comprises means for utilizing the CSI feedback information, including the inter-transmission point phase relationship that is indicated by the PMI value, for selecting precoders for accomplishing a coherent joint CoMP transmission.

The exemplary embodiments of this invention further encompass a method, an apparatus and a computer program product configured to enable a user equipment to receive a measurement configuration for a set of n CSI-RS resources, where the set of n CSI-RS resources includes at least one CSI-RS resource that spans over at least two transmission points, and to measure and report CSI feedback corresponding to each CSI-RS resource, where the CSI feedback comprises at least PMI and possibly RI and corresponding CQI for each configured CSI-RS resource.

In this method, apparatus and computer program product at least one PMI value that is fed back indicates an inter-transmission point phase relationship for enabling a network resource scheduler function to at least select precoders for accomplishing a coherent joint CoMP transmission to the user equipment.

In this method, apparatus and computer program product the user equipment is restricted to reporting Rank=1.

It should thus be appreciated that at least some aspects of the exemplary embodiments of the inventions may be practiced in various components such as integrated circuit chips and modules, and that the exemplary embodiments of this invention may be realized in an apparatus that is embodied as an integrated circuit. The integrated circuit, or circuits, may comprise circuitry (as well as possibly firmware) for embodying at least one or more of a data processor or data processors, a digital signal processor or processors, base-band circuitry and radio frequency circuitry that are configurable so as to operate in accordance with the exemplary embodiments of this invention.

In the JT CoMP scheme, a UE can feed back single cell PMIs from two cells through two CSI-RS resources, and use a third CSI-RS resource to probe the co-phasing information. One method to probe the co-phasing information is by mapping two antennas from two transmission points to two CSI-RS ports. Yet this mapping scheme is problematic as the JT CoMP scheme requires sub-band channel information. In a sub-band, the signal at one antenna can suffer severe fading hence the probed co-phasing information is of low quality. In another scheme, more than one antennas from each TP are mapped to CSI-RS ports alternately in PRBs in a sub-band (a sub-band consists of multiple PRBs). By probing with more than one antenna from each TP, the impact of severe fading is reduced and a co-phasing information of higher quality is obtained.

Receiver Model and Co-Phasing Information Through PMI

Embodiments of the invention recognize that coherent joint transmission (JT) achieves better performance using a subband precoding matrix indicator (PMI) than with a wideband PMI. Embodiments of the invention therefore provide mechanisms to feedback one or more subband PMI in coherent JT applications. If a single antenna port is used to provide a phase reference for each transmission point (TP) is used to provide the phase reference for each TP, this single port signal may suffer fade, so that the extracted phase information is of little use. Embodiments of the invention therefore provide for the use of two antenna ports from each transmission point to provide a phase reference, recognizing that that the probability that both antenna port signals in a subband will suffer fade at the same time is lower than the probability that one antenna port signal will suffer fade.

In one approach, the transmitted signals from two physical antennas at each TP are precoded and mapped to one antenna port in resource 3. TPs use different precoders, for example, [1 1], [1 1], [1 j], [1 −j], from one occasion to another. For example, in subframe 1, TP1 may use [1 1] to map physical antennas 1 and 3 on TP 1 to antenna port 0 in resource 3, and TP2 may use [1 −1] to map physical antennas 1 and 3 on TP2 to antenna port 1 in resource 3. If it happens that the desired codeword on resource 1 is [1 x 1 y] and the desired codeword on resource 2 is [1 a −1 b], then the feedback PMI on resource 3 is useful for a base station such as an eNodeB (eNB) to determine the phase difference, or construct an estimate of the phase difference, between two TPs. Otherwise, a user device, such as a user equipment (UE) or an eNB must wait until the right combination is used on resource 3 to determine the phase difference between two TPs. Additional examples are described below. It can be seen that in one or more embodiments of the invention, resource 3 may be used in a time division multiplexing (TDM) fashion for all UEs being served by TP1 and TP2, and the feedback on resource 3 is useful when the proper combination of precoded transmissions occurs on both TPs.

In another approach, a factorization of the rotation matrix is performed. At each TP, a fixed precoding matrix, obtained from the factorization of the rotation matrix, is applied to two physical antennas. The precoded signal is mapped to one port in resource 3. An eNB does not change the precoder applied on physical antennas from resource 3 from one occasion to another, and so the feedback from resource 3 always provides information relating to the correct phase difference, as well as preventing the loss of reliability of phase information associated with fading.

Embodiments of the present invention recognize that a receiver, such as a receiver of a UE, may be modeled as:

$$r=(H_1v_1+H_2v_2\alpha)x+n$$

The co-phase optimization involves changing $\alpha$ to maximize $$(H_1v_1+H_2v_2\alpha)^H(H_1v_1+H_2v_2\alpha)=v_1^H H_1^H H_1 v_1 + v_2^H H_2^H H_2 v_2 + 2re(v_1^H H_1^H H_2 v_2 \alpha)$$

Low-rank approximation may be used for both $H_1$ and $H_2$:

$$H_1 \approx c_1 v_1^H$$

$$H_2 \approx c_2 v_2^H$$

The following expression can be derived from the equations above:

$$2re(v_1^H H_1^H v_2 \alpha) = 2re(c_1^H c_2 \alpha)$$

Assuming a low-rank approximation, $\alpha$ can also be determined from correlation between two matrix channels.

In one approach, UE selected precoders may be used. These may be v1, v2, which can be derived from the channel state information reference signal (CSI-RS) resources configured for single cell CSI on the CSI-RS ports. This yields:

$$tr((H_1v_1)^H(H_2v_2))=tr(v_1^H H_1^H H_2 v_2)$$

It may be desirable to restrict the selection of probing antennas used in each TP, and in such a case, the combination of v1 and v2 is limited. It may therefore be feasible for the eNB to obtain PMI feedback from a group of UEs {v1,v2}. Depending on system configuration and prevailing conditions, the eNB may trigger aperiodic CSI feedback, allowing a group of UEs that happen to have the same {v1,v2} to feed back the PMI from an inter-TP CSI-RS resource. For UEs set to send periodic CSI, it may be desired to use only the feedback matching the precoder combination {v1,v2} at the eNB.

In a second approach, all the UEs configured with an inter-TP CSI-RS resource may use the resource to compute a PMI, and the PMI may be suitable for both periodic and aperiodic CSI feedback. Transmission may be performed on CSI-RS ports, with the UE forming the correlation:

$$tr(H_1^H H_2) \approx tr(v_1 c_1^H c_2 v_2^H) = (v_2^H v_1)(c_1^H c_2)$$

Yet if $v_1$ happens to be orthogonal with $v_2$, then the correlation formed here is zero.

Therefore, embodiments of the present invention introduce a rotation precoder R at TP2. In an exemplary embodiment, both TP1 and TP2 may be 2 Tx, that is, using two transmission antennas. The use of the rotation precoder yields $$tr(H_1^H H_2 R) \approx tr(v_1 c_1^H c_1 c_2 v_2^H R) = (v_2^H R v_1)(c_1^H c_2)$$

Transmission point configurations may be chosen so that $(v_2^H R v_1)$ is non-zero for all $v_1$ and $v_2$. Consequently for 4Tx (using four transmit antennas at each TP), only the first and third antennas are mapped to the resources. For 8 Tx (using 8 transmit antennas at each TP), only the first and fifth antennas are mapped to the resources. With this restriction, the codeword $v_1$ and $v_2$ can only take values from [1 1], [1 –1], [1 j], and [1 –j]. By introducing the precoder R, effectively the UE finds the best PMI matches with $$(v_2^H R v_1)(c_1^H c_2).$$

The rotation matrix R is given by $$\begin{bmatrix} 1 & 1 \\ 1 & -1 \end{bmatrix}$$

It is also possible to split the rotation matrix into two parts, with each part being used at a TP:

$$R_1 = R_2^H$$

$$= \begin{bmatrix} 1.0000 & 0.3334 - 0.4714i \\ 0.3334 - 0.4714i & 0.3332 + 0.9429i \end{bmatrix}$$

FIG. 11 therefore illustrates a first transmission point 1100 comprising ports 1102A-1102D, and a second transmission port 1150 comprising ports 1152A-1152D. A first CSI-RS resource 1110 is configured across the ports 1102A-1102D of the transmission point 1100 and a second CSI-RS resource 1160 is configured across the ports 1152A-1152D of the transmission point 1150. The first resource may have a first precoded transmission 1115 with a PMI 1 and the second resource may have a second precoded transmission 1165 with a PMI 2.

An inter-transmission point CSI-RS resource may be configured on ports 1102A and 1152D to identify the co-phasing coefficient $\alpha$. However, if the port 1102A or 1152A suffers fading, the identified a is not reliable. A first embodiment of the invention, therefore, provides for the configuration of a third resource CSI-RS 1180 across specified ports of the first and second transmission points 1100 and 1150, respectively. The third CSI-RS resource may, for example, be configured on port 1100A and port 1152A. Not all antennas of both transmission points need necessarily be used for the third CSI-RS resource. Joint transmission CoMP UEs may be divided into groups—UEs having the same subset PMI and subset of PMI 2 can share a CSI-RS resource 3.

FIG. 12 illustrates a process 1200 according to an embodiment of the present invention. At block 1201, first, second, and third CSI-RS resources are configured at a first transmission point, at a second transmission point, and across the first and second transmission points, respectively. At block 1202, a first transmission point sends a first CSI-RS resource. At block 1204, a UE measures and sends back PMI1, CQI1, and RI1, based on the first CSI-RS resource. At block 1206, a second transmission point sends a second CSI-RS resource. At block 1208, a UE measures and sends back PMI2, CQI2, and RI2, based on the first CSI-RS resource. At block 1210, the first and second transmission points send PMI1 and PMI2, respectively, over one port of a third CSI-RS resource. Transmission may be in the form of a two-port reference signal, one from the first transmission point, and one from the second. Transmission of PMI1 and PMI2 are accomplished simultaneously. At block 1212, the UE measures and sends back PMI3 as feedback to an eNB, and at block 1214 the eNB calculates a joint transmission co-phasing term from PMI1, PMI2, and PMI3.

In another embodiment of the invention, a rotation precoding vector is sent by the first and second transmission points. FIG. 13 illustrates a process 1300 according to this alternative embodiment of the invention. At block 1301, first, second, and third CSI-RS resources are configured at a first transmission point, at a second transmission point, and across the first and second transmission points, respectively. At block 1302, a first transmission point sends a first CSI-RS resource. At block 1304, a UE measures and sends back PMI1, CQI1, and RI1, based on the first CSI-RS resource. At block 1306, a second transmission point sends a second CSI-RS resource. At block 1308, a UE measures and sends back PMI2, CQI2, and RI2, based on the first CSI-RS resource. At block 1310, the first and second transmission points send a rotation precoding vector alternating on physical resource blocks on one port from the third CSI-RS resource. This resource may comprise a two-port reference signal, one from the first transmission point and one from the second transmission point at the same time. Transmission of PMI1 and PMI2 are accomplished simultaneously. This approach may be extended to more than one transmission point: in a two transmitter approach, the ports might be the first and second port of each transmitter; in a four transmitter approach, the ports might be the first and third ports of each transmitter, and in an 8 transmitter approach, the ports might be the first and fifth ports of each transmitter.

At block 1312, the UE measures and sends back PMI3 as feedback to an eNB, and at block 1314 the eNB calculates a joint transmission co-phasing term from PMI1, PMI2, and PMI3.

Various modifications and adaptations to the foregoing exemplary embodiments of this invention may become apparent to those skilled in the relevant arts in view of the foregoing description, when read in conjunction with the accompanying drawings. However, any and all modifications will still fall within the scope of the non-limiting and exemplary embodiments of this invention.

For example, while the exemplary embodiments have been described above in the context of the E-UTRAN (LTE-A) system, it should be appreciated that the exemplary embodiments of this invention are not limited for use with only this one particular type of wireless communication system, and that they may be used to advantage in other wireless communication systems.

It should be noted that the terms "connected," "coupled," or any variant thereof, mean any connection or coupling, either direct or indirect, between two or more elements, and may encompass the presence of one or more intermediate elements between two elements that are "connected" or "coupled" together. The coupling or connection between the elements can be physical, logical, or a combination thereof. As employed herein two elements may be considered to be "connected" or "coupled" together by the use of one or more wires, cables and/or printed electrical connections, as well as by the use of electromagnetic energy, such as electromagnetic energy having wavelengths in the radio frequency region, the microwave region and the optical (both visible and invisible) region, as several non-limiting and non-exhaustive examples.

Further, the various names used for the described parameters (e.g., CSI-RS_TP1={port15_1, port16_1, port17_1, port18_1}, CQI, PMI, RI, etc.) are not intended to be limiting in any respect, as these parameters may be identified by any suitable names. Further, any formulas and expressions that use these various parameters may differ from those expressly disclosed herein. Further, the various names assigned to different channels (e.g., PDSCH) and information elements are not intended to be limiting in any respect, as these various channels and information elements may be identified by any suitable names.

Furthermore, some of the features of the various non-limiting and exemplary embodiments of this invention may be used to advantage without the corresponding use of other features. As such, the foregoing description should be considered as merely illustrative of the principles, teachings and exemplary embodiments of this invention, and not in limitation thereof.

We claim:

1. An apparatus comprising:
at least one processor;
memory storing a program of instructions;
wherein the memory storing the program of instructions is configured to, with the at least one processor, cause the apparatus to at least:
computing a co-phasing coefficient value for maximizing signal to noise ratio of a composite channel for transmission to a user device, the composite channel comprising first and second transmission points, wherein computing the co-phasing value comprises:
receiving first, second, and third precoding matrix indicators, wherein the third precoding matrix indicator is computed based on transmission of the first and second precoding matrix indicators over a joint channel state information reference signal resource from first and second transmission points; and
calculating the co-phasing coefficient value based on the first, second, and third precoding matrix indicators;
wherein the first and second precoding matrix indicators are computed based on feedback by a user device based, respectively, on transmissions of first and second channel state information reference resources from first and second transmission points, respectively, and
wherein the third precoding matrix indicator is based on simultaneous transmission of a rotation precoding vector by the first and second transmission points; and
based on the computing, performing a coherent joint cooperative multipoint transmission.

2. The apparatus of claim 1, wherein:
the first precoding matrix indicator is computed by the user device based on a transmission of the first channel state information reference signal resource by the first transmission point, wherein the user device measures and returns the first precoding matrix indicator along with a first channel quality indicator and first reference index; and
the second precoding matrix indicator is computed by the user device based on a transmission of the second channel state information reference signal resource by the second transmission point, wherein the user device measures and returns the second precoding matrix indicator along with a second channel quality indicator and second reference index.

3. The apparatus of claim 2, wherein:
the third precoding matrix indicator is computed based on simultaneous respective transmissions by the first and second transmission points over one port of a third channel state information reference signal resource.

4. The apparatus of claim 3, wherein the third channel state information reference signal resource comprises a two-port reference signal with one port from the first transmission point and one port from the second transmission point.

5. The apparatus of claim 1, wherein the rotation precoding vector is:

$$R_1 = R_2^H$$
$$= \begin{bmatrix} 1.0000 & 0.3334 - 0.4714i \\ 0.3334 - 0.4714i & 0.3332 + 0.9429i \end{bmatrix}.$$

6. A method comprising:
computing a co-phasing coefficient value for maximizing signal to noise ratio of a composite channel for transmission to a user device, the composite channel comprising first and second transmission points, wherein computing the co-phasing value comprises:
receiving first, second, and third precoding matrix indicators, wherein the third precoding matrix indicator is computed based on transmission of the first and second precoding matrix indicators over a joint channel state information reference signal resource from first and second transmission points; and
calculating the co-phasing coefficient value based on the first, second, and third precoding matrix indicators;
wherein the first and second precoding matrix indicators are computed based on feedback by a user device based, respectively, on transmissions of first and second channel state information reference resources from first and second transmission points, respectively, and
wherein the third precoding matrix indicator is based on simultaneous transmission of a rotation precoding vector by the first and second transmission points; and
based on the computing, performing a coherent joint cooperative multipoint transmission.

7. The method of claim 6, wherein:
the first precoding matrix indicator is computed by the user device based on a transmission of the first channel state information reference signal resource by the first transmission point, wherein the user device measures and returns the first precoding matrix indicator along with a first channel quality indicator and first reference index; and
the second precoding matrix indicator is computed by the user device based on a transmission of the second channel state information reference signal resource by the second transmission point, wherein the user device measures and returns the second precoding matrix indicator along with a second channel quality indicator and second reference index.

8. The method of claim 7, wherein:
the third precoding matrix indicator is computed based on simultaneous respective transmissions by the first and second transmission points over one port of a third channel state information reference signal resource.

9. The method of claim 8, wherein the third channel state information reference signal resource comprises a two-port reference signal with one port from the first transmission point and one port from the second transmission point.

10. The method of claim 6, wherein the rotation precoding vector is:

$$R_1 = R_2^H$$
$$= \begin{bmatrix} 1.0000 & 0.3334 - 0.4714i \\ 0.3334 - 0.4714i & 0.3332 + 0.9429i \end{bmatrix}.$$

11. A computer program product embodied on a non-transitory readable medium storing a computer program of instructions, execution of which by a processor configures an apparatus to control or carry out at least:
computing a co-phasing coefficient value for maximizing signal to noise ratio of a composite channel for transmission for transmission to a user device, the composite channel comprising first and second transmission points, wherein computing the co-phasing value comprises:
receiving first, second, and third precoding matrix indicators, wherein the third precoding matrix indicator is computed based on transmission of the first and second precoding matrix indicators over a joint channel state information reference signal resource from first and second transmission points; and
calculating the co-phasing coefficient value based on the first, second, and third precoding matrix indicators;
wherein the first and second precoding matrix indicators are computed based on feedback by a user device based, respectively, on transmissions of first and second channel state information reference resources from first and second transmission points, respectively, and
wherein the third precoding matrix indicator is based on simultaneous transmission of a rotation precoding vector by the first and second transmission points; and
based on the computing, performing a coherent joint cooperative multipoint transmission.

12. The computer program product of claim 11, wherein:
the first precoding matrix indicator is computed by the user device based on a transmission of the first channel state information reference signal resource by the first transmission point, wherein the user device measures and returns the first precoding matrix indicator along with a first channel quality indicator and first reference index; and
the second precoding matrix indicator is computed by the user device based on a transmission of the second channel state information reference signal resource by the second transmission point, wherein the user device measures and returns the second precoding matrix indicator along with a second channel quality indicator and second reference index.

13. The computer program product of claim 12, wherein:
the third precoding matrix indicator is computed based on simultaneous respective transmissions by the first and second transmission points over one port of a third channel state information reference signal resource.

14. The computer program product of claim 13, wherein the third channel state information reference signal resource comprises a two-port reference signal with one port from the first transmission point and one port from the second transmission point.

15. The computer program product of claim 11, wherein the rotation precoding vector is:

$$R_1 = R_2^H$$
$$= \begin{bmatrix} 1.0000 & 0.3334 - 0.4714i \\ 0.3334 - 0.4714i & 0.3332 + 0.9429i \end{bmatrix}.$$

16. A method comprising:
configuring a two-port channel state information reference signal resource across two cells of a wireless cellular network,
wherein the two ports are first and second ports, and
wherein first and second precoding vectors, respectively, are used for transmission on the first and second ports of the resource, and wherein a third precoding matrix indicator is based on simultaneous transmission of a rotation precoding vector by the first and second transmission points: and deriving a co-phasing factor for cooperative multipoint transmission based on the transmitted precoding vectors: and
based on the configuring and deriving, performing a coherent joint cooperative multipoint transmission.

17. The method of claim 16, where at least one of the precoding vectors is chosen for alternate physical resource blocks from columns of a 2×2 rotation matrix.

* * * * *